(12) United States Patent
Geer, III et al.

(10) Patent No.: US 10,460,358 B2
(45) Date of Patent: *Oct. 29, 2019

(54) INTEGRATION OF AN ADVERTISING UNIT CONTAINING INTERACTIVE RESIDUAL AREAS AND DIGITAL MEDIA CONTENT

(71) Applicant: Viacom International, Inc., New York, NY (US)

(72) Inventors: Walter Geer, III, Bronx, NY (US); Ellen To, New York, NY (US); Suzanne McDonnell, New York, NY (US); Adam Solomon, East Setauket, NY (US); Mark Fortner, New York, NY (US); Jason Witt, South Orange, NJ (US)

(73) Assignee: Viacom International Inc., New York, NY (US)

( * ) Notice: Subject to any disclaimer, the term of this patent is extended or adjusted under 35 U.S.C. 154(b) by 338 days.

This patent is subject to a terminal disclaimer.

(21) Appl. No.: 15/415,124

(22) Filed: Jan. 25, 2017

(65) Prior Publication Data

US 2017/0132672 A1    May 11, 2017

Related U.S. Application Data

(63) Continuation of application No. 12/902,785, filed on Oct. 12, 2010, now Pat. No. 9,595,040.

(Continued)

(51) Int. Cl.
*G06Q 30/02* (2012.01)
*H04N 21/4143* (2011.01)
(Continued)

(52) U.S. Cl.
CPC ......... *G06Q 30/0277* (2013.01); *G06Q 30/02* (2013.01); *G06T 13/80* (2013.01);
(Continued)

(58) Field of Classification Search
CPC .................................................... G06Q 30/02
(Continued)

(56) References Cited

U.S. PATENT DOCUMENTS

6,912,504 B1   6/2005   Rashkovskiy
7,054,831 B2   5/2006   Koenig
(Continued)

*Primary Examiner* — Marilyn G Macasiano
(74) *Attorney, Agent, or Firm* — Fay Kaplun & Marcin, LLP (57) ABSTRACT

Described are systems and methods for dynamic integration and presentation of advertising content and media content. The method includes receiving a request for media content from a remote computing device. The method also includes providing an interactive advertising unit, which comprises a first content layer including the requested media content and a media player, a second content layer including the advertising content, wherein the advertising content comprises video content and website content, and an integration module configured to display the video content to match the boundaries of the media player, extend the display area of the video content, reduce the display area of the video content after a period of time, display the website content in an area outside of the boundaries of the media player, and display the requested media content in the media player. The method also includes transmitting the interactive advertising unit for presentation on the remote computing device.

15 Claims, 7 Drawing Sheets

Related U.S. Application Data (60) Provisional application No. 61/250,019, filed on Oct. 9, 2009.

(51) Int. Cl.
*H04N 21/431* (2011.01)
*H04N 21/472* (2011.01)
*H04N 21/81* (2011.01)
*G06T 13/80* (2011.01)

(52) U.S. Cl.
CPC ..... *H04N 21/4143* (2013.01); *H04N 21/4316* (2013.01); *H04N 21/47202* (2013.01); *H04N 21/812* (2013.01); *H04N 21/8173* (2013.01)

(58) Field of Classification Search
USPC ...................................................... 705/14.73
See application file for complete search history.

(56) References Cited

U.S. PATENT DOCUMENTS

| | | |
|---|---|---|
| 7,263,714 B2 | 8/2007 | Lowthert et al. |
| 2001/0056370 A1 | 12/2001 | Tafla |
| 2004/0015608 A1 | 1/2004 | Ellis et al. |
| 2004/0116183 A1 | 6/2004 | Prindle |
| 2004/0186771 A1 | 9/2004 | Squires |
| 2005/0267813 A1 | 12/2005 | Monday |
| 2006/0143675 A1 | 6/2006 | Willis et al. |
| 2006/0242016 A1 | 10/2006 | Chenard |
| 2007/0072676 A1 | 3/2007 | Baluja |
| 2007/0112630 A1 | 5/2007 | Lau et al. |
| 2007/0260677 A1 | 11/2007 | DeMarco et al. |
| 2008/0021775 A1 | 1/2008 | Lerman et al. |
| 2008/0066107 A1 | 3/2008 | Moonka et al. |
| 2008/0077952 A1 | 3/2008 | St. Jean et al. |
| 2008/0097915 A1 | 4/2008 | Golan et al. |
| 2008/0194332 A1 | 8/2008 | Kadikario et al. |
| 2008/0209465 A1 | 8/2008 | Thomas et al. |
| 2008/0320512 A1 | 12/2008 | Knight |
| 2009/0024482 A1 | 1/2009 | Synstelien et al. |
| 2009/0063280 A1 | 3/2009 | Wurster et al. |
| 2009/0094525 A1 | 4/2009 | Coelius et al. |
| 2009/0163281 A1 | 6/2009 | Wang |
| 2009/0265367 A1 | 10/2009 | Corbett |

INTEGRATION OF AN ADVERTISING UNIT CONTAINING INTERACTIVE RESIDUAL AREAS AND DIGITAL MEDIA CONTENT

RELATED APPLICATIONS

The present application is a Continuation Application of U.S. Non-Provisional patent application Ser. No. 12/902,785 filed on Oct. 12, 2010, now U.S. Pat. No. 9,595,040; which claims priority to U.S. Provisional Patent Application Ser. No. 61/250,019 filed on Oct. 9, 2009. The entire disclosure of these prior applications/patents are considered as being part of the disclosure of the accompanying application and hereby expressly incorporated by reference herein.

TECHNICAL FIELD

The subject matter of this application relates generally to methods and apparatuses, including computer program products, for integration of an advertising unit containing interactive residual areas and digital media content.

BACKGROUND

Content providers have long sought to include advertising as part of their broadcasts in order to generate revenue and recoup the costs of content production, and manufacturers of consumer goods have placed their ads with various content providers in order to extol the virtues of their goods to the largest possible consumer audience. For example, ever since their earliest days, radio and television stations frequently have broadcast blocks of ads in between their programming segments. More recently, content providers on the Internet have utilized banner advertisements, pop-up advertisements, and other forms of interactive advertising on websites.

In order to capitalize on the recent explosion in availability of online media (e.g., streaming video feeds), content providers, consumer goods companies, and advertising firms have turned their attention to developing dynamic and interactive experiences for users who access the online media.

SUMMARY OF THE INVENTION

It would be desirable to have a method and system for dynamically integrating advertising content with media content (e.g., digital media content) to achieve the effect of linking the advertisement with the context of the digital media content, web page, and/or the embedded media player, thereby increasing the advertisement's exposure to the consumer. Also, it would be desirable in some examples to completely interrupt the desired media content in a linear fashion by displaying the advertising content first, but also providing the user with a mechanism to interact with the advertising content and view the media content. It would be desirable in some examples to present the advertising content and the digital media content in a non-linear fashion so to leave the digital media content uninterrupted and substantially unobstructed while at the same time displaying the advertising content to the user, allowing the user to enjoy the desired media content while simultaneously viewing the advertising content. Also, it would be desirable in some examples to allow the user to interact with the advertising content and/or tie the media content and the advertising content together in a unique and unanticipated way.

In general overview, the techniques described herein are related to integration of a fully interactive rich media advertising unit and media content (e.g., digital media content) presented in a media player. The techniques provide for simulated integration, creating an illusion to a user that the advertising content and digital media content are brought together in the media player. The techniques also provide for functional integration via interaction between the advertising unit and the media player, including manipulation of spatial, temporal, and control components, resulting in a unique presentation of the advertising content and digital media content to the user. Spatial integration refers to the synchronization of position and coverage between the advertising unit and the media player. Temporal integration refers to the coordination of content display timing between the advertising unit and the media player. Control integration refers to the communication between the advertising unit and the media player in transferring influence and priority of displayed content. The techniques advantageously enable dynamic and unexpected interplay between digital media content contained in an embedded media player and an interactive, persistent advertising unit configured to capture the attention of a user and offer an engaging, memorable experience.

The invention, in one aspect, features a method for dynamic integration and presentation of advertising content and media content. The method includes receiving, by a server computing device, a request for media content from a remote computing device. The method also includes providing, by the server computing device in response to the request, an interactive advertising unit. The interactive advertising unit comprises a first content layer including the requested media content and a media player, a second content layer including the advertising content, wherein the advertising content comprises video content and website content, and an integration module. The integration module is configured to display the video content to match the boundaries of the media player, extend the display area of the video content beyond the boundaries of the media player, reduce the display area of the video content after a period of time to match the boundaries of the media player, display the website content in an area outside of the boundaries of the media player, and display the requested media content in the media player. The method also includes transmitting, by the server computing device, the interactive advertising unit for presentation on the remote computing device.

The invention, in another aspect, features a system for dynamic integration and presentation of advertising content and media content. The system includes a server computing device configured to receive a request for media content from a remote computing device and provide, in response to the request, an interactive advertising unit. The interactive advertising unit includes a first content layer including the requested media content and a media player, a second content layer including the advertising content, wherein the advertising content comprises video content and website content, and an integration module. The integration module is configured to display the video content to match the boundaries of the media player, extend the display area of the video content beyond the boundaries of the media player, reduce the display area of the video content after a period of time to match the boundaries of the media player, display the website content in an area outside of the boundaries of the media player, and display the requested media content in the media player. The server computing device is also configured to transmit the interactive advertising unit for presentation on the remote computing device.

The invention, in another aspect, features a computer program product, tangibly embodied in a computer readable storage medium, for dynamic integration and presentation of advertising content and media content. The computer program product includes instructions operable to configure a data processing apparatus to receive a request for media content from a remote computing device, and provide, in response to the request, an interactive advertising unit. The interactive advertising unit includes a first content layer including the requested media content and a media player, a second content layer including the advertising content, wherein the advertising content comprises video content and website content, and an integration module. The integration module is configured to display the video content to match the boundaries of the media player, extend the display area of the video content beyond the boundaries of the media player, reduce the display area of the video content after a period of time to match the boundaries of the media player, display the website content in an area outside of the boundaries of the media player, and display the requested media content in the media player. The computer program product also includes instructions operable to configure a data processing apparatus to transmit the interactive advertising unit for presentation on the remote computing device.

In some embodiments, any of the above aspects can include one or more of the following features. In some embodiments, the integration module can be further configured to manage the spatial presentation of the requested media content and the advertising content, synchronize the temporal presentation of the requested media content and the advertising content, and control the presentation priority of the requested media content and the advertising content. In some embodiments, managing the spatial presentation includes positioning the advertising content over the media player so as to obscure the requested media content. In some embodiments, managing the spatial presentation includes positioning the advertising content in proximity to the media player so as to display the requested media content unobscured.

In some embodiments, the integration module displays an animation in extending the display area of the video content beyond the boundaries of the media player. In some embodiments, the integration module extends the display area of the video content to a widescreen format. In some embodiments, the integration module displays an animation in reducing the display area of the video content to match the boundaries of the media player.

In some embodiments, the video content and the website content are related according to genre, theme, advertised product, subject matter, or any combination thereof. In some embodiments, the website content includes information related to a product displayed in the video content. In some embodiments, the integration module is further configured to receive input based on a user action.

In some embodiments, at least one of the video content and the website content includes a graphical representation of an advertised product, an advertised service, or both. In some embodiments, the integration module is configured to transmit one or more commands from the second content layer to the first content layer, the one or more commands operable to control playback of the requested media content in the media player.

Further features and advantages of the present invention as well as the structure and operation of various embodiments of the present invention are described in detail below with reference to the accompanying drawings.

DETAILED DESCRIPTION

In general overview, the techniques described herein are directed to methods and apparatuses, including computer program products, for dynamic integration and presentation of advertising content and media content (e.g., digital media content). As described in more detail, the advertising content is combined with the digital media content (displayed in, for example, a media player) in a seamless fashion to provide an interactive advertising unit. The creation of the interactive advertising unit provides the advantages of greatly increasing a user's exposure to the advertising content while not materially diminishing the user's consumption of the digital media content. The nature of the interactive advertising unit, displaying advertising content in proximity to requested digital media content, allows the use of a broad range of marketing techniques, such as product placement, brand association, and click-through opportunities. Thus, the techniques provide an opportunity for manufacturers to increase the effectiveness of their advertising while maintaining the accessibility and appeal of the requested digital media content.

The display of the advertising and digital media content is not limited to a web browser or traditional embedded media player. For example, the advertising content and/or video content could be displayed to a user via an interactive application downloaded and executed on a smart phone, i.e., an "app" configured to run on the iPhone® from Apple® Computer, Inc.

Figure 1:
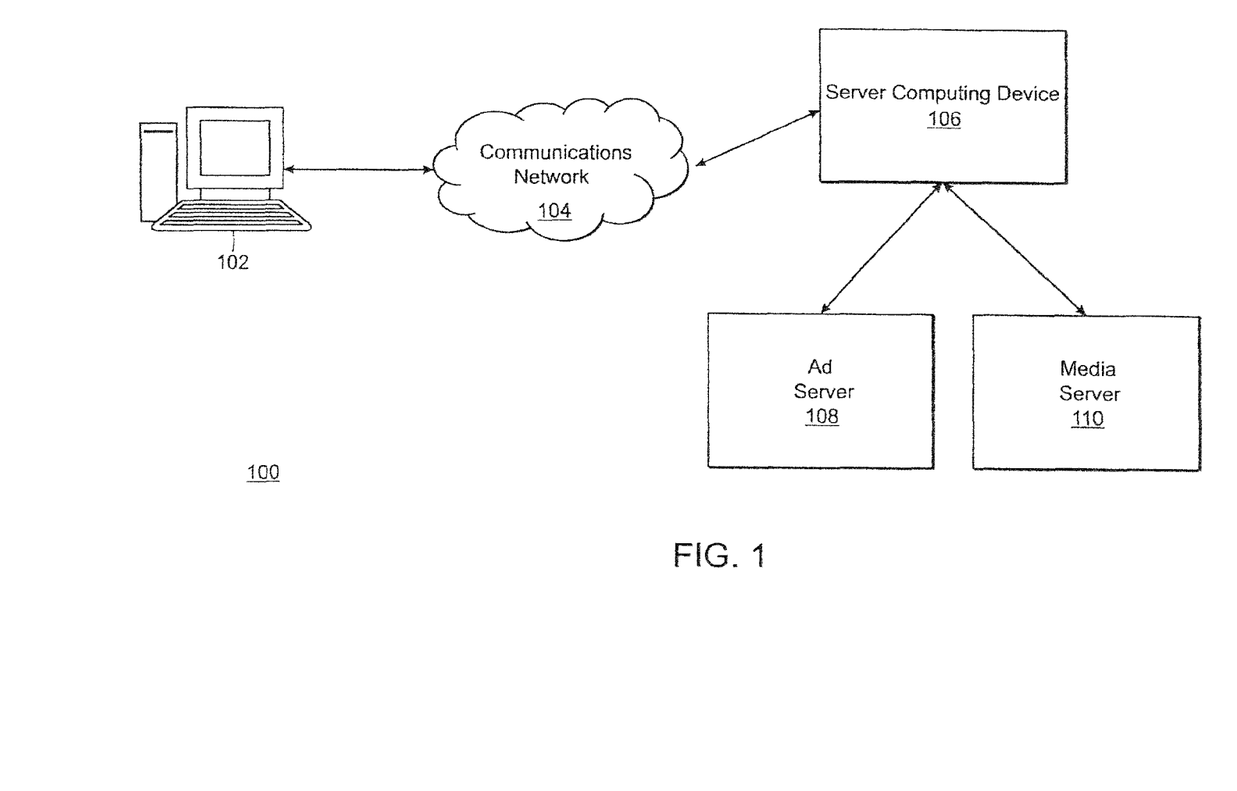
FIG. 1 is a block diagram of a system for the dynamic integration and presentation of advertising and media content.

FIG. 1 is a block diagram of a system 100 for dynamic integration and presentation of advertising and media content. The system 100 includes a client computing device 102, a communications network 104, and a server computing device 106. In some embodiments, the server computing device 106 is connected to one or more other computing devices which provide advertising content (e.g., ad server 108) and digital media content (e.g., video server 110). The server computing device 106, ad server 108, and video server 110 can reside at the same physical location or may be dispersed to multiple physical locations. The server computing device 106, ad server 108, and video server 110 can be located on the same physical device or one or more of the servers 106, 108, 110 can be distributed over many devices. The server computing device 106, ad server 108, and video server 110 can communicate via a communications network, for example communications network 104.

The client computing device 102 is the hardware that displays the interactive advertising unit containing advertising content and digital media content to a user. Example computing devices take on many forms, including but not limited to a personal computer, a standalone video player, a home video game console, a portable video game system, a personal digital assistant (PDA), an internet appliance, a smart phone, a set-top box, or the like. The computing device 102 includes network-interface components to enable the user to connect to a communications network 104, such as the Internet. The computing device 102 also includes browser software to enable the user to interact with web sites and other content providers, Some example browser software includes Microsoft® Internet Explorer, Mozilla Firefox®, or other similar software applications. The client computing device 102 also includes digital content playback plug-ins or standalone software to enable the user to view digital media content (e.g., video and audio) received over the communications network 104. Examples of digital media content playback software includes Microsoft® Windows Media® Player, Adobe® Flash® Player, QuickTime® from Apple® Computer, Inc., or other similar applications.

The server computing device 106 hosts web pages and other similar content, and receives content requests from the client computing device 102 via the communications network 104.

The communications network 104 channels communications from the client computing device 102 to the server computing device 106. The network 104 may be a local network, such as a LAN, or a wide area network, such as the Internet or the World Wide Web.

The ad server 108 hosts advertising content for use by the server computing device 106. In some embodiments, the ad server 108 receives requests for advertising content directly from the client computing device 102 via the communications network 104. In some embodiments, the ad server 108 receives requests for advertising content from the client computing device 102 by way of the server computing device 106. Advertising content can take a variety of forms. Examples include a static banner ad, a graphical animation or an interactive, rich media application that contains graphics, animation, audio, and/or video content, such as a Flash® application.

The media server 110 hosts digital media content for use by the server computing device 106. In some embodiments, the media server 110 can receive requests for digital media content from the client computing device 102 via the communications network 104. In some embodiments, the media server 110 receives requests for advertising content from the client computing device 102 by way of the server computing device 106. The digital media content can take a variety of forms. The media content can be short-form video content, i.e., a four-minute music video. The media content can be long-form video content, i.e., a thirty-minute television program. The media content can be audio content, i.e., a radio broadcast. Other examples include user-submitted amateur video, professional television shows, motion pictures, webcasts, podcasts, music videos, or other similar content.

Figure 2:
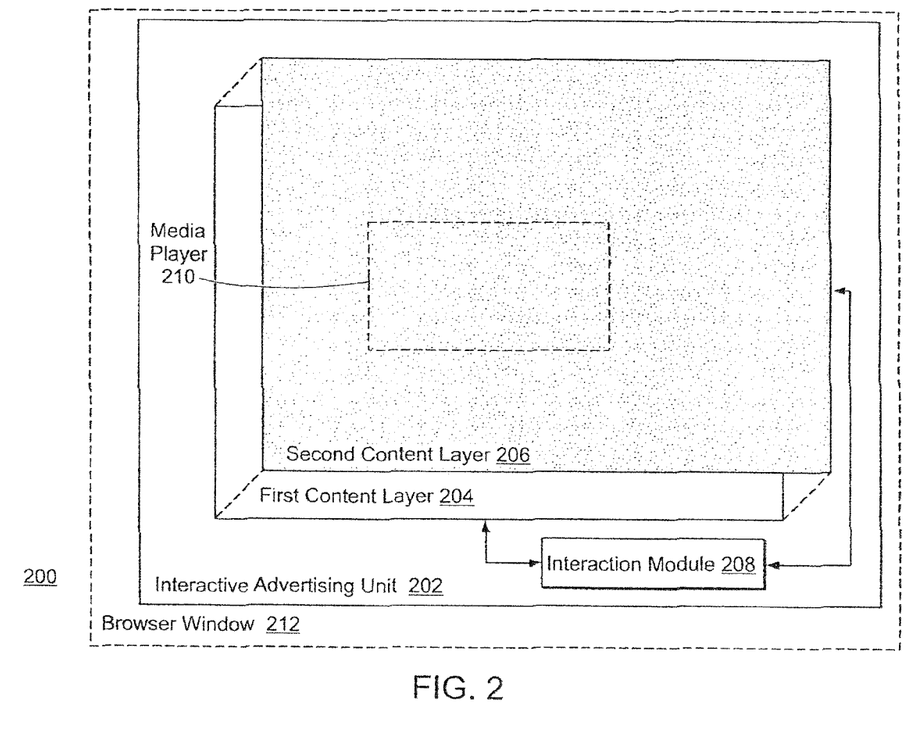
FIG. 2 is a diagram of an interactive advertising unit to display media content and advertising content.

FIG. 2 is a diagram 200 of an interactive advertising unit 202 to display media content and advertising content.

A user interacts with the system 100 by opening a web browser 212 on the client computing device 102 and entering the address of the web server 106. The client computing device 102 sends a content request associated with the address entered by the user to the server computing device 106. Once the server computing device 106 receives the request, the server computing device 106 retrieves the requested content and transmits the content for display in the web browser 212 on the computing device 102. For example, the user can enter a standard web address, such as http://www.mtv.com/videos/, into the browser window 212 at the client computing device 102. The web server 106 can then transmit the web page located at mtv.com/videos/ to the computing device 102 for display in the browser 212.

In yet other examples, the owner of the server computing device 106 may wish to present an advertisement to the user when the user requests digital media content. As above, the user interacts with the system 100 by entering or navigating to the address of media content associated with the server computing device 106. Upon receiving the request, the server computing device 106 retrieves the requested media content (e.g., from media server 110). Before transmitting the requested media content to the computing device 102, the server computing device retrieves advertising content (e.g., from the ad server 108). In some embodiments, the advertising content is selected by the server computing device 106 based on predetermined criteria, such as a focused advertising campaign. Examples of an advertising campaign can include a predetermined number of displays of the advertising content, a predefined period of time in which the advertising content will be selected for display, a marketing association between the owner of the advertising content, the producer of the requested video content, and the like. The server computing device 106 combines the advertising content and the requested digital media content to provide an interactive advertising unit 202. The server computing device 106 transmits the interactive advertising unit 202 to the client computing device 102 for presentation to a user. The interactive advertising unit 202 presents the advertising content (e.g., from ad server 108) along with the digital media content requested by the user (e.g., from media server 110) in a number of interesting, memorable, and dynamic ways, as shown below.

In some embodiments, the server computing device 106 combines the digital media content and the advertising content into an interactive advertising unit 202 using a multi-layered approach. The server computing device 106 places the digital media content and associated media player into a first content layer 204, and places the advertising content into a second content layer 206. In one embodiment, the second content layer 206 is positioned on top of the first content layer 204 of the interactive advertising unit 202. The interactive advertising unit 202 is transmitted to the client computing device 102 for display, such as in browser window 212 (e.g., embedded in a larger web page). In some embodiments, the interactive advertising unit 202 provides the second content layer 206 using the <div> tag provided by the HTML programming language, in association with Cascading Style Sheets (CSS) to coordinate presentation attributes of the <div> tag.

The interactive advertising unit 202 includes an interaction module 208 which coordinates the interactions between the content layers (e.g., first content layer 204 and second content layer 206). The interaction module 208 manages the spatial presentation, synchronizes the temporal presentation, and controls the presentation priority of the advertising content and the digital media content in the respective content layers 204 and 206. The interaction module 208 coordinates the spatial, temporal, and control functionality to work in concert with each other, advantageously merging the features of each presentation type.

Management of the spatial relationship between the digital media content and the media player in the first content layer 204, and the advertising content in the second content layer 206, is important to providing an engaging and dynamic experience to the user. In one embodiment, the interaction module 208 of the interactive advertising unit 202 positions the second content layer 206 in certain areas above the first content layer 204, thereby enabling the strategic placement of the advertising content in an area that catches the user's attention while keeping the digital media content in the first content layer 204 unobstructed and available for viewing. In another embodiment, the interaction module 208 of the interactive advertising unit 202 positions the second content layer 206 in certain areas above the first content layer 204 in a way that masks or obscures the digital media content in the first content layer 204. In this embodiment, the interaction module 208 leverages the masking of the digital media content to emphasize the advertising content or to reveal the digital media content to the user in a dramatic and unexpected way. In any of these embodiments, the second content layer 206 can be partially or fully transparent until the interactive advertising unit 202 displays the advertising content.

Synchronization of the temporal relationship between the digital media content and the media player in the first content layer 204, and the advertising content in the second content layer 206, is also important to achieving a unique and unexpected user experience. In one embodiment, the interaction module 208 displays advertising content (e.g., a pre-roll video, a pop-up ad) before presentation of the digital media content to assist the user in making a "connection" between the advertised goods and the media content, and thereby increasing the user's anticipation of and engagement in the content.

In addition, control of the presentation priority between the digital media content in the first content layer 204, and the advertising content in the second content layer 206, is important for augmenting the interactive functionality of the interactive advertising unit 202 to increase user interest in and appeal of the presented content. In one embodiment, the interaction module 208 of the interactive advertising unit 202 displays the advertising content until the module 208 receives a user input request to skip the advertising content and begin displaying the requested digital media content in the media player 210, thereby inducing the user to interact with the advertising content and maximizing exposure for the advertised goods. In another embodiment, the interaction module 208 of the interactive advertising unit 202 displays the advertising content until the content has completed its playback then transitions to displaying the requested digital media content in an unexpected way. In this embodiment, the interaction module 208 integrates the display of the advertising content seamlessly into the overall presentation to enable advertising opportunities that are dynamic and interesting.

Although shown as covering almost the entire browser window 212, the content layers 204 and 206 of the interactive advertising unit 202 can vary in size and cover any portion of the browser window 212. In some embodiments, the interactive advertising unit 202 includes multiple content layers, in addition to the first and second content layers 204 and 206, In one embodiment, the interactive advertising unit 202 places one content layer (e.g., second content layer 206) above a media player 210 contained in another content layer (e.g., first content layer 204), while the interactive advertising unit 202 can place another separate content layer (not shown) above a different section of the browser window 212, such as above the top portion or in a side margin. The interaction module 208 of the interactive advertising unit 202 coordinates the spatial presentation management, temporal presentation synchronization, and the presentation priority control of the content residing in each of the provided content layers (e.g., layers 204 and 206). In one embodiment, the interaction module 208 uses a protocol such as LocalConnections provided in the Adobe Flash® development tool to communicate between the respective content layers (e.g., layers 204 and 206).

FIGS. 3A-3E are screenshots of an exemplary embodiment of an interactive advertising unit (e.g., interactive advertising unit 302c) provided by the system 100, wherein the advertising unit 302c contains interactive residual areas combined with digital media content. Although the advertising content and interactive residual areas embodied herein are related to advertisement of a movie, the invention is not limited in content or scope to this embodiment and can encompass any advertising subject, theme, or products.

Figure 3A:
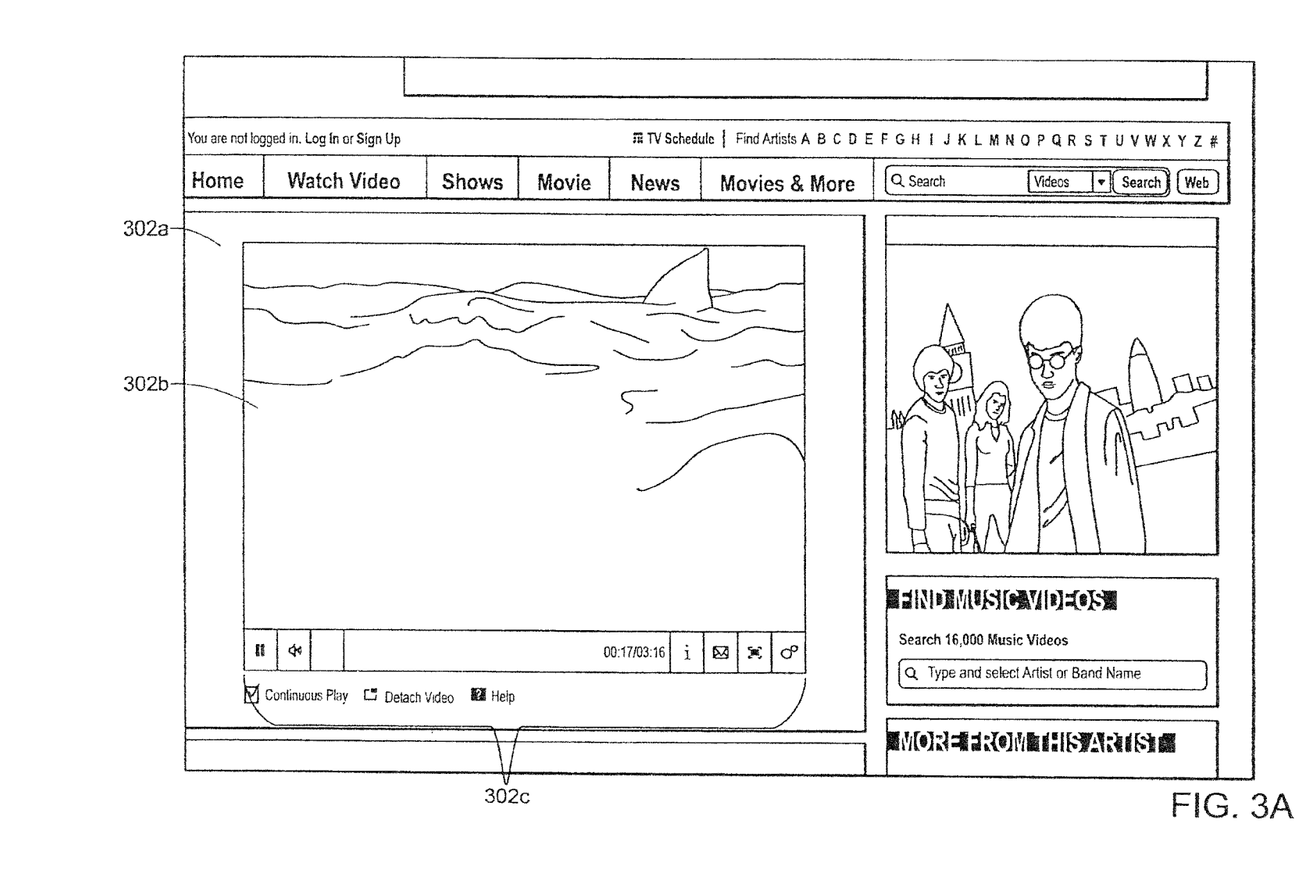
FIGS. 3A-3E are screenshots of an exemplary embodiment of an interactive advertising unit provided by the system, wherein the advertising content includes interactive residual areas integrated with digital media content.

When a user at a client computing device (e.g., client computing device 102) navigates to a web page that hosts the desired digital media content, the server computing device 106 receives the request and retrieves the requested media content (e.g., from video server 110) and advertising content (e.g., from ad server 108). The server computing device 106 combines the advertising content and the digital media content to provide an interactive advertising unit 302c (as shown in FIG. 3A). The interactive advertising unit 302c places the advertising content—e.g., a pre-roll advertising video—into the second content layer, and places the digital media content in the first content layer which includes the media player 302b (e.g., in a browser window 302a).

In this embodiment, the second content layer covers the entire area of the media player 302b in the first content layer. The interactive advertising unit 302c displays the advertising video in the second content layer. The interaction module of the interactive advertising unit 302c positions the advertising video within the boundaries of the media player 302b to appear as a simulated "pre-roll" video. As the advertising video is displayed, the interaction module of the interactive advertising unit 302c controls the presentation priority of the respective content by queuing up the requested digital media content in the media player 302b and pausing it at the first frame to await either the bypass or the completion of the advertising video.

Figure 3B:
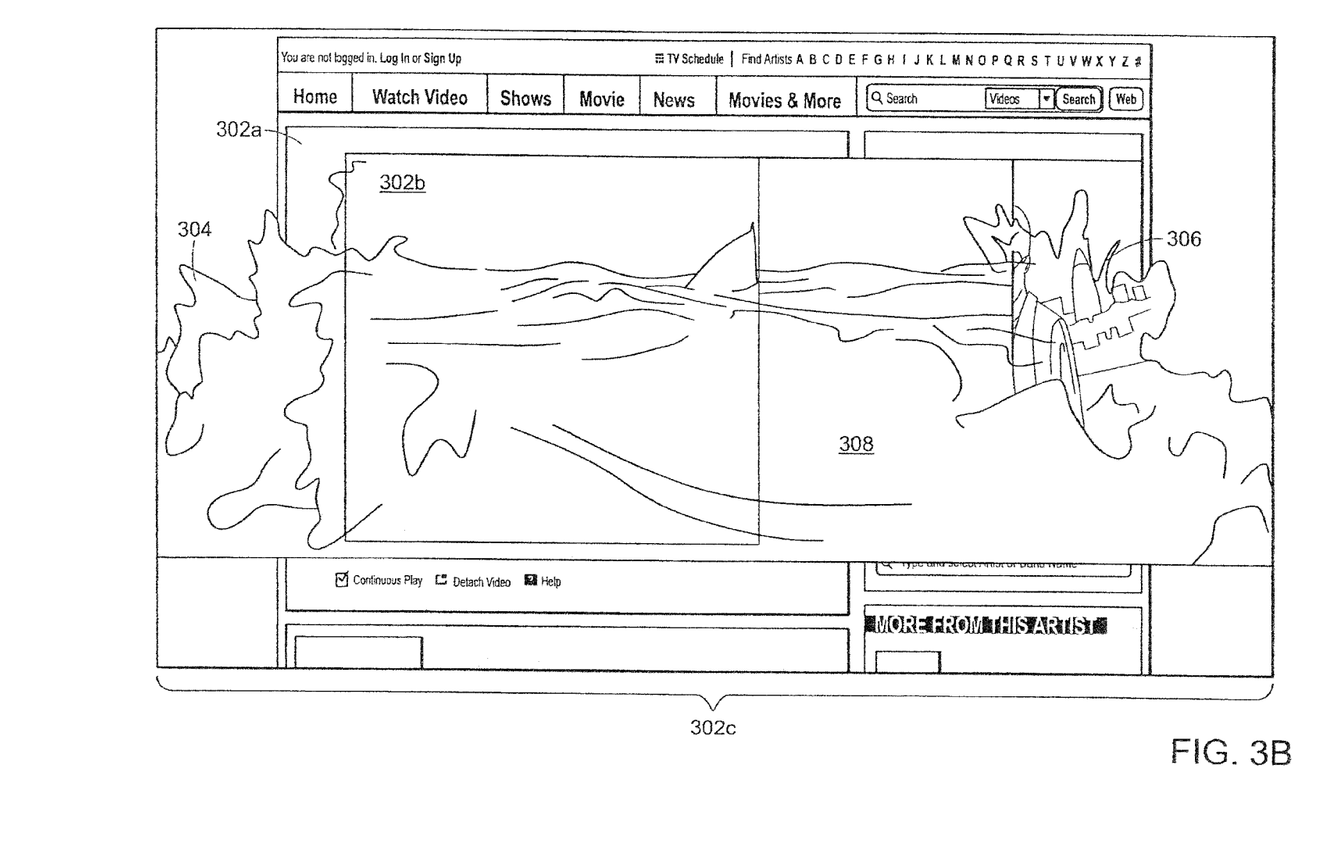

Shortly after the interactive advertising unit 302c begins playback of the advertising video (e.g., 5 seconds), the interactive advertising unit 302c displays an animation to provide the appearance of breaking the simulated boundaries of the media player 302b in a visually stimulating and unexpected manner. Referring to FIG. 3B, the outline of the playback area of the media player 302b is shown as a square. For example, the interactive advertising unit 302c can display a sudden burst of animation (e.g., the waves represented by reference characters 304 and 306 of FIG. 3B) at the sides, top and/or bottom of the media player. The animation can be associated with the content of the advertising video. In one example, as shown in FIG. 3B, the waves 306 crash and flow to the sides of the web page while the image of an ocean 308 is playing in the advertising video. The interactive advertising unit 302c gives the effect of the ocean 308 rushing to the sides of the web page and flowing over the bottom of the media player playback area 302b in synchronization with the waves 306, thereby covering over the previously visible content of the web page—including the media player 302b and associated media content.

Figure 3C:
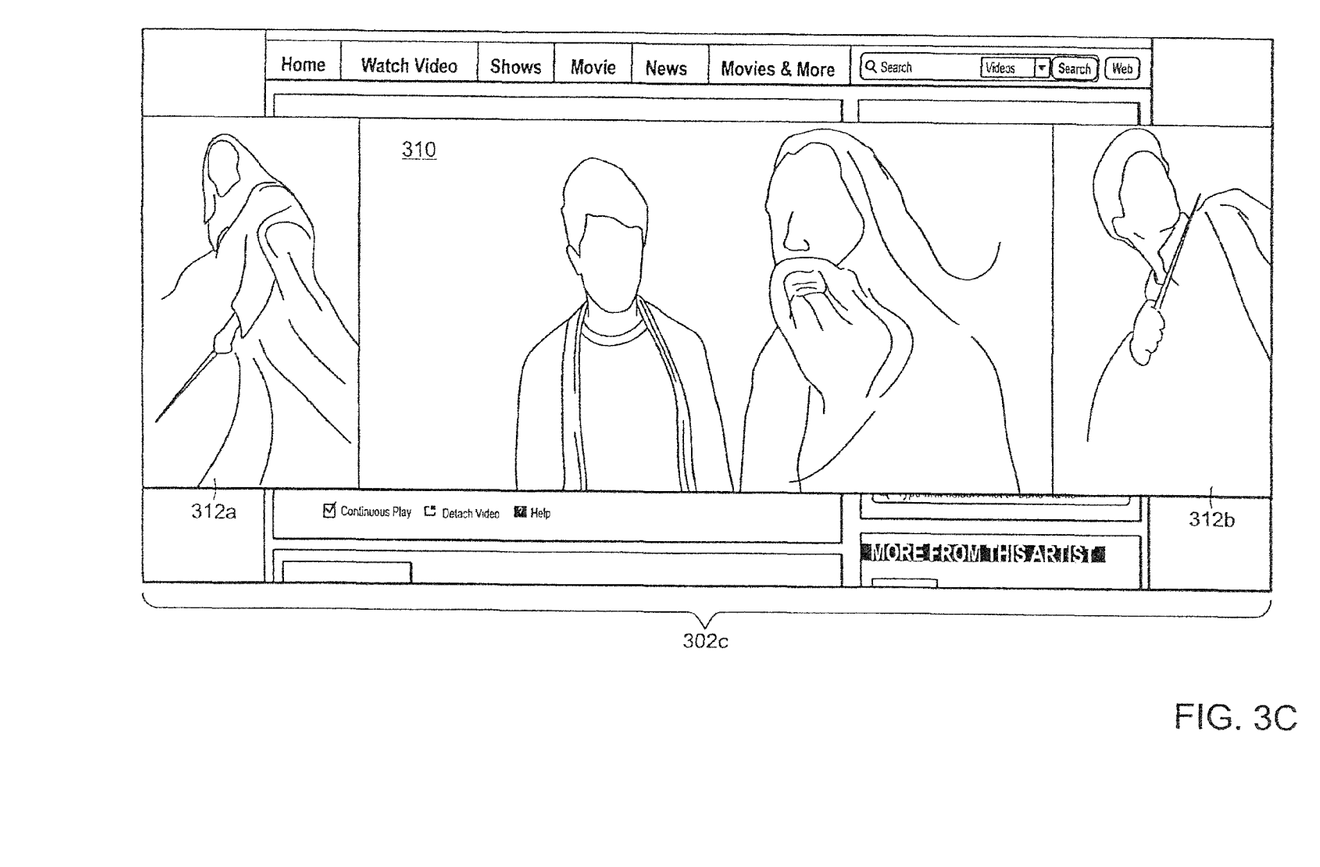

At the same time, the interactive advertising unit 302c expands to stretch across the entire web page, transforming into a widescreen area 310 (as shown in FIG. 3C). The advertising video (e.g., a movie preview trailer) continues to play within the newly-expanded area 310. In some examples, the widescreen area can cover the entire width of the web page. In other examples, as shown in FIG. 3C, the widescreen area 310 can cover less than the entire width of the page, and include advertising areas 312a-b which contain content associated with the interactive advertising unit 302e. The advertising areas 312a-b can be synchronized with the playback of the advertising video. For example, the advertising areas 312a-b can change color, illumination, or other appearance characteristics as those characteristics change in the advertising video.

Figure 3D:
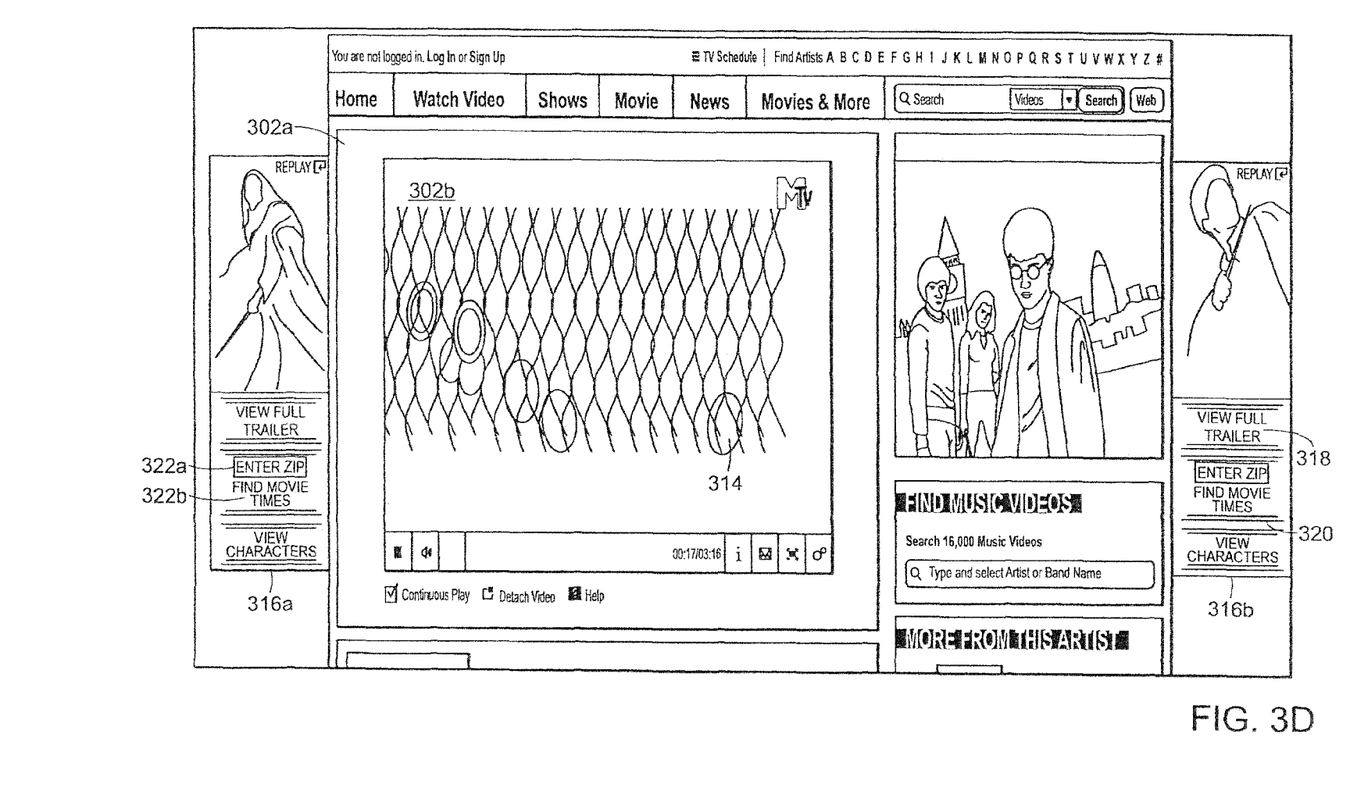

Once the interactive advertising unit 302c concludes playback of the advertising video, the interactive advertising unit 302c can withdraw from the widescreen area 310 to reveal the media player 302b. The interactive advertising unit 302c returns control to the media player 302b. When the media player 302b receives control, the media player 302b resumes playback of the digital media content 314, as shown in FIG. 3D. However, the interactive advertising unit 302c does not completely disappear from the web page. The interactive advertising unit 302c remains present through displaying interactive residual areas 316a-b on the sides of the browser window 302a. The interactive residual areas 316a-b are not limited to displaying static advertisements or stripped-down features. Instead, the areas 316a-b can comprise one or several microsites, containing the full capability found in typical web sites. The microsites can be related in content, genre, subject matter, theme and/or advertised product to the advertising content previously displayed by the interactive advertising unit 302c, and can include input tools such as buttons, links, and search fields to enhance the user experience by providing additional interactivity and prominence of the advertising content and advertised product(s), For example, as shown in FIG. 3D, the microsites include buttons to view additional content related to the advertised product displayed in the interactive advertising unit 302c, such as a full trailer video of an advertised movie (e.g., button 318) or detailed information on characters from the movie (e.g., button 320). Upon clicking one of these functions, the interactive advertising unit 302c regains control from the media player 302b, and recaptures the widescreen area as indicated above to display content associated with the function requested by the user.

Another feature found in a microsite displayed in the interactive residual areas is a search function. The microsite can include a search text box 322a in which the user can enter input to include as part of the search criteria. For example, as shown in FIG. 3D, the user can enter his or her zip code into the search text box 322a and click the "Find Movie Times" button 322b to search for theaters near that location which are currently playing the advertised movie.

Figure 3E:
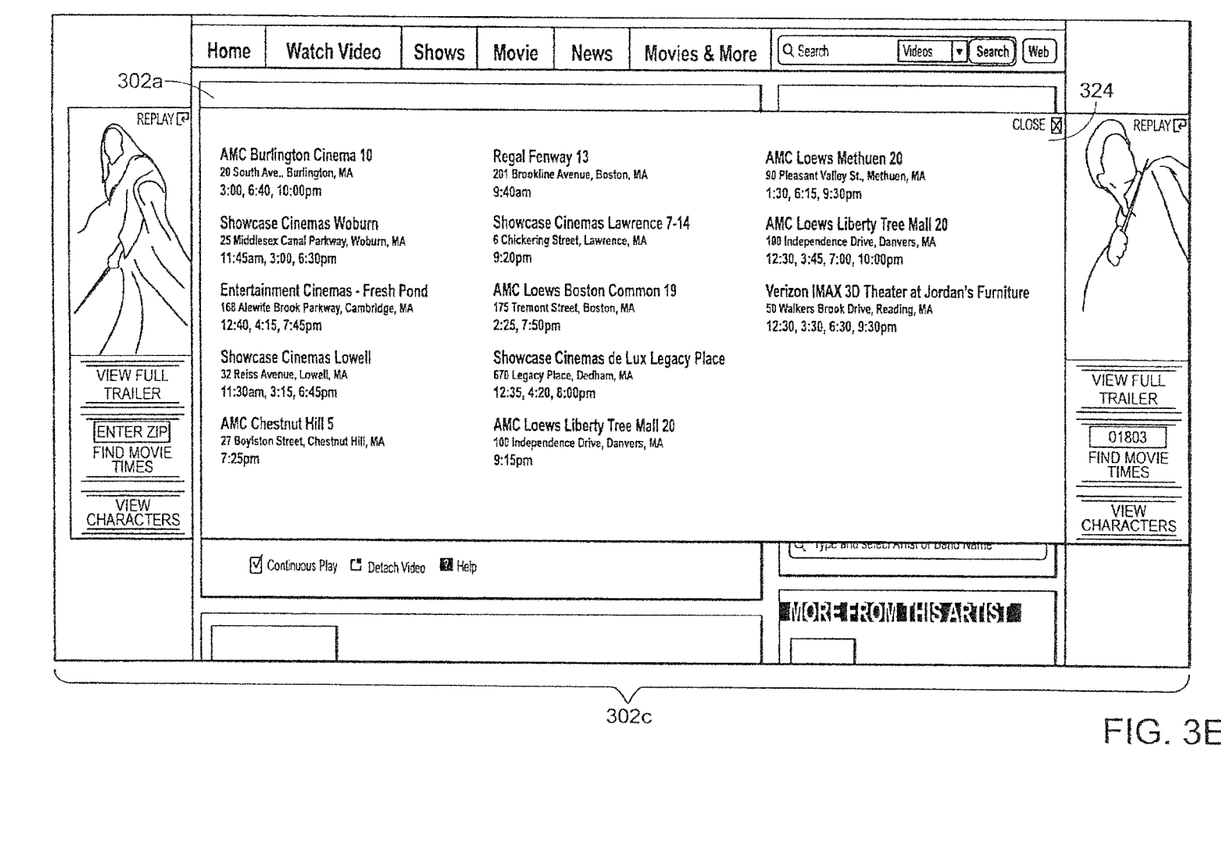

The search results 324 are shown in FIG. 3E. The interaction module of the interactive advertising unit 302c transfers control from the media player 302b to the interactive advertising unit 302c and stops playback of the requested digital media content. The interactive advertising unit 302c reclaims the area across the width of the webpage to display the theater and show time information, and covers the digital media content in the media player 302b. The search results 324 are completely interactive, e.g., the user can click on any of the theater names or show times to get additional information or to purchase tickets.

The above-described systems and methods can be implemented in digital electronic circuitry, in computer hardware, firmware, and/or software, The implementation can be as a computer program product (i.e., a computer program tangibly embodied in a computer readable medium). The implementation can, for example, be in a machine-readable storage device and/or include a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array), an ASIC (application-specific integrated circuit), a DSP (digital signal processor), and/or any other discrete circuitry that is configured to implement the required functions. Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Computer readable mediums suitable for embodying computer program instructions and data include all forms of non-volatile memory, including by way of example semiconductor memory devices. The computer readable mediums can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The client device and the computing device can include, for example, a computer, a computer with a browser device, a telephone, an IP phone, a mobile device (e.g., cellular phone, personal digital assistant (PDA) device, smart phone, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®.

The web servers can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communication networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A method for dynamic integration and presentation of advertising content and media content, the method comprising:
   receiving, by a server computing device, a request for media content from a remote computing device;
   providing, by the server computing device in response to the request, an interactive advertising unit comprising:
      a first content layer including the requested media content;
      a second content layer including the advertising content, wherein the advertising content comprises video content and website content; and
      an integration module configured to operate on the remote computing device to:
         display the video content;
         reduce a display area of the video content after a period of time;
         display the website content in an area outside of the display area of the video content; and
         display the requested media content; and
   transmitting, by the server computing device, the interactive advertising unit for presentation on the remote computing device.

2. The method of claim 1, wherein the integration module is further configured to operate on the remote computing device to:
   manage the spatial presentation of the requested media content and the advertising content;
   synchronize the temporal presentation of the requested media content and the advertising content; and
   control the presentation priority of the requested media content and the advertising content.

3. The method of claim 2, wherein managing the spatial presentation includes positioning the advertising content over the media player to obscure the requested media content.

4. The method of claim 2, wherein managing the spatial presentation includes positioning the advertising content in proximity to the media player to display the requested media content unobscured.

5. The method of claim 1, wherein the integration module is configured to operate on the remote computing device to display an animation in extending the display area of the video content.

6. The method of claim 1, wherein the integration module is configured to operate on the remote computing device to extend the display area of the video content to a widescreen format.

7. The method of claim 1, wherein the integration module displays an animation in reducing the display area of the video content.

8. The method of claim 1, wherein the video content and the website content are related according to one of genre, theme, advertised product and subject matter.

9. The method of claim 1, wherein the website content includes information related to a product displayed in the video content.

10. The method of claim 1, wherein the integration module is further configured to operate on the remote computing device to receive input based on a user action.

11. The method of claim 1, wherein at least one of the video content and the website content includes a graphical representation of one of an advertised product and an advertised service.

12. The method of claim 1, wherein the integration module is configured to operate on the remote computing device to transmit commands from the second content layer to the first content layer, the commands being operable to control playback of the requested media content.

13. The method of claim 1, wherein the interactive advertising unit further comprises a media player.

14. A system for dynamic integration and presentation of advertising content and media content, the system comprising:
   a server computing device configured to:
      receive a request for media content from a remote computing device;
      provide, in response to the request, an interactive advertising unit comprising:
         a first content layer including the requested media content;

a second content layer including the advertising content, wherein the advertising content comprises video content and website content; and
an integration module configured to operate on the remote computing device to:
display the video content in an initial display area;
extend the display area of the video content beyond the boundaries of the initial display area to an extended display area;
reduce the display area of the video content from the extended display area after a period of time to match the boundaries of the initial display area;
display the website content in an area outside of the boundaries of the initial display area; and
display the requested media content; and
transmit the interactive advertising unit for presentation on the remote computing device.

15. A computer program product, tangibly embodied in a non-transitory computer readable storage medium, for dynamic integration and presentation of advertising content and media content, the computer program product including instructions operable to configure a data processing apparatus to:

receive a request for media content from a remote computing device;
provide, in response to the request, an interactive advertising unit comprising:
a first content layer including the requested media content;
a second content layer including the advertising content, wherein the advertising content comprises video content and website content; and
an integration module configured to operate on the remote computing device to:
display the video content in an initial display area;
extend the display area of the video content beyond the boundaries of the initial display area to an extended display area;
reduce the display area of the video content from the extended display area to the initial display area after a period of time;
display the website content in an area outside of the initial display area; and
display the requested media content; and
transmit the interactive advertising unit for presentation on the remote computing device.

* * * * *